United States Patent [19]
Kannan et al.

[11] Patent Number: 5,815,702
[45] Date of Patent: Sep. 29, 1998

[54] METHOD AND SOFTWARE PRODUCTS FOR CONTINUED APPLICATION EXECUTION AFTER GENERATION OF FATAL EXCEPTIONS

[76] Inventors: Ravi Kannan; Babu Katchapalayam, both of 11826 Kiowa Ave. #101, Los Angeles, Calif. 90049; Bing Liu, 1016 S. Second St., Alhambra, Calif. 91801

[21] Appl. No.: 686,250

[22] Filed: Jul. 24, 1996

[51] Int. Cl.$^6$ ....................................................... G06F 9/46
[52] U.S. Cl. ...................... 395/591; 395/182.13; 395/733
[58] Field of Search .................................... 395/591, 618, 395/182.13, 183.14, 733

[56] References Cited

U.S. PATENT DOCUMENTS 5,526,485   6/1996   Brodsky .............................. 395/183.14
5,628,016   5/1997   Kukol ....................................... 395/704

OTHER PUBLICATIONS

Pearsall, B., "DataSafe Comdex Version 2.1", www.awa.com/nct/software/datasafe., Markland Communities, Inc. 1995.

*Primary Examiner*—Glenn A. Auve
*Attorney, Agent, or Firm*—Fenwick & West LLP

[57] ABSTRACT

A method of operating a computer and a software product, enable a computer system and application to continue execution after the application has generated a fatal exception. This allows the user to save any data file that was being used at the time the fatal exception was generated, and thereby not lose that data that would have otherwise been lost by the operating system spontaneously terminating the application because of the fatal exception. The method involves receiving a notification that the application has generated an exception, notifying the operating system that the exception has been handled, so as to "fool" the operating system and prevent it from spontaneously terminating the application, and then to enable the application to continue operating so that the user can save any unsaved data by executing a continuous loop of code in place of the main message loop of the faulting application. The continuous loop receives messages and events for the application and passes them to the proper executable components of the application. The software product includes an exception handler that receives notification from the operating system of the fatal exception, a background process that is notified by the exception handler of this occurrence and that prompts the user with an option to terminate or continue the application, and a continuous loop of code instructions that replaces a message loop of the application, thereby enabling it to continue execution.

11 Claims, 4 Drawing Sheets

METHOD AND SOFTWARE PRODUCTS FOR CONTINUED APPLICATION EXECUTION AFTER GENERATION OF FATAL EXCEPTIONS

BACKGROUND

1. Field of Invention

The present invention relates to systems and methods for managing operating systems and applications, and more particularly, to systems and methods for enhanced exception handling of fatal exceptions.

2. Background of Invention

Computer programs—applications, operating systems, utilities, and other executable software products—often contain or generate errors during operation. These errors result sometimes from programmer mistakes. Errors may also result due to unforeseen interactions between one program and other programs, including the operating system operating at the same time, particularly with respect to how the programs access portions of the computer memory.

Conventional programming theory teaches that computer programs should be designed, as nearly as possible, to operate as finite state machines, in which all possible states of the program are known and controlled. Accordingly, software engineers attempt to anticipate error conditions that might occur when the program is executing in a computer system, typically writing "defensive" programs that gracefully handle those error conditions that have been foreseen.

However, it is well known that it is impossible to foresee every possible situation that may occur when a computer program executes in a given operating environment. The operating environment is provided not only by the operating system, but also by other manufacturers' programs that may be running simultaneously. Thus, the operating environment can become extremely complicated, making it impossible to anticipate every state of a software program, or know with certainty everything about the environment in which the program will be operating. Beizer states that "If the objective of testing were to prove that a program is free of bugs, then testing not only would be practically impossible, but also would be theoretically impossible." *Software Testing Techniques*, 2nd ed., p. 24 (1990) (emphasis in original). Similarly, Dijkstra's maxim is well known: "Software testing can only reveal the presence of bugs, not their absence." Accordingly, programs will always have some amount of unexpected behavior.

Certain types of application errors—also called "exceptions"—trigger special operating system functions known as "exception handlers." Exception handler functions typically terminate the application that originated the error; sometimes they cause the operating system itself to shut down.

The following types of errors, or faults, typically result in application termination:

General protection fault/Page fault: An application tries to access a memory location that is outside the memory space it has permission to use.

Stack exception: An application tries to access a special memory area called the "stack" but tries to access it in an area of memory that is outside of the stack's designated memory area.

Low stack fault: The amount of available memory in the stack's memory area is less than predetermined number of bytes. This can occur when an application process is using up stack memory and not releasing it, for example with some recursive processes.

Invalid opcode exception: Programs and commands can have different levels of "privilege" within the operating system. "Lower-privilege" programs are not allowed to execute "higher privilege" instructions. When the next instruction to be executed by the CPU has a higher "privilege" than the application's code (instructions), the CPU generates an invalid opcode fault.

Division by zero.

For the purposes of this disclosure, exceptions that at least conventionally cause an application to terminate execution are referred to as "fatal exceptions."

Conventional programming theory teaches the approach of terminating the application that generated the fatal exception because these types of exceptions take the application (and possibly other applications) outside of the operating states intended by the programmer. Because the program may behave unpredictably, and hence destructively of its own or other data, conventional programming theory teaches terminating the application immediately to avoid such unforeseen and potentially catastrophic consequences. Unfortunately, from the user's perspective, when the application "crashes" the user typically loses all work done since the last time the file being used by the application was saved. For the user, this loss of data may be equally catastrophic or costly, typically causing the user to redo work, which may take many hours.

However, when one of the above faults triggers an operating system's exception handler, it is possible that the application and the operating environment are still stable enough to allow the user to save unsaved work, even though the operating system cannot detect this stability.

Accordingly, it is desirable to provide a software product and computer implemented method of operation that allows a user to continue using an application even after a fatal exception has been generated, in order to save work in files being used by the application.

SUMMARY OF THE INVENTION

In accordance with one aspect of the present invention, there is provided a software product that enables a user to continue using an application that has generated a fatal exception, one that would otherwise cause the operating system to terminate execution of the application. Once the application is enabled to continue executing, the user can save a currently open file, thereby preserving any data that has been entered since the last time the file was saved. The execution of the application is enabled by providing a safe message loop in the computer memory for execution by the processor. This safe message loop is a set of computer executable instructions that define a continuous loop of execution. The safe message loop replaces the main or idle loop of the application that has faulted, regardless of what that application is. The safe message loop receives messages or events from the operating system and passes the messages to the appropriate program components of the application. The processor continues to execute the safe message loop in this manner until the user terminates the application. In one embodiment, in response to the application generating the exception, the user is prompted to select whether to continue executing the application or to terminate the application. After the user elects to continue execution, she may save the current files, perform other functions, and may even continue using the application further. In this manner, the user is able to continue executing the application after the exception has been generated, rather than the operating system unilaterally terminating the application, and destroying any unsaved work. In general, the work may be saved through other means, such as sending a message to a remote computer or another process or subsystem on the same computer before the faulting application terminates.

In one embodiment, a software product in accordance with the present invention includes an exception handler that is loaded into the memory of a computer in conjunction with the exception handlers of the operating system of the computer, along with a code portion defining the safe message loop. When an application generates an exception, the exception handler of the present invention is called, instead of the operating system's exception handler for the specific type of exception. The exception handler of the present invention then replaces the message or idle loop of the application with the safe message loop by providing the starting address of the safe message loop to the processor. This may be done by storing the starting address of the safe message loop in the memory location that otherwise stores the next instruction of the application. The contents of this memory location are loaded into an instruction register of the processor when the application is activated. The processor then begins and continues execution within the safe message loop instead of the idle loop of the application.

As a further feature and element of the present invention, the software product may include a background executable application that loads the exception handler and safe message loop into memory for subsequent execution. The background application is invoked by the exception handler of the present invention when a fatal exception is generated, and prompts the user on the display of the computer to either continue the application or terminate its execution. If the user elects to continue, the exception handler operates as described to replace the message loop of the application. The user can then save their data. If the user elects to terminate, the operating system is accordingly instructed to terminate the application.

DETAILED DESCRIPTION OF THE INVENTION

Figure 1:
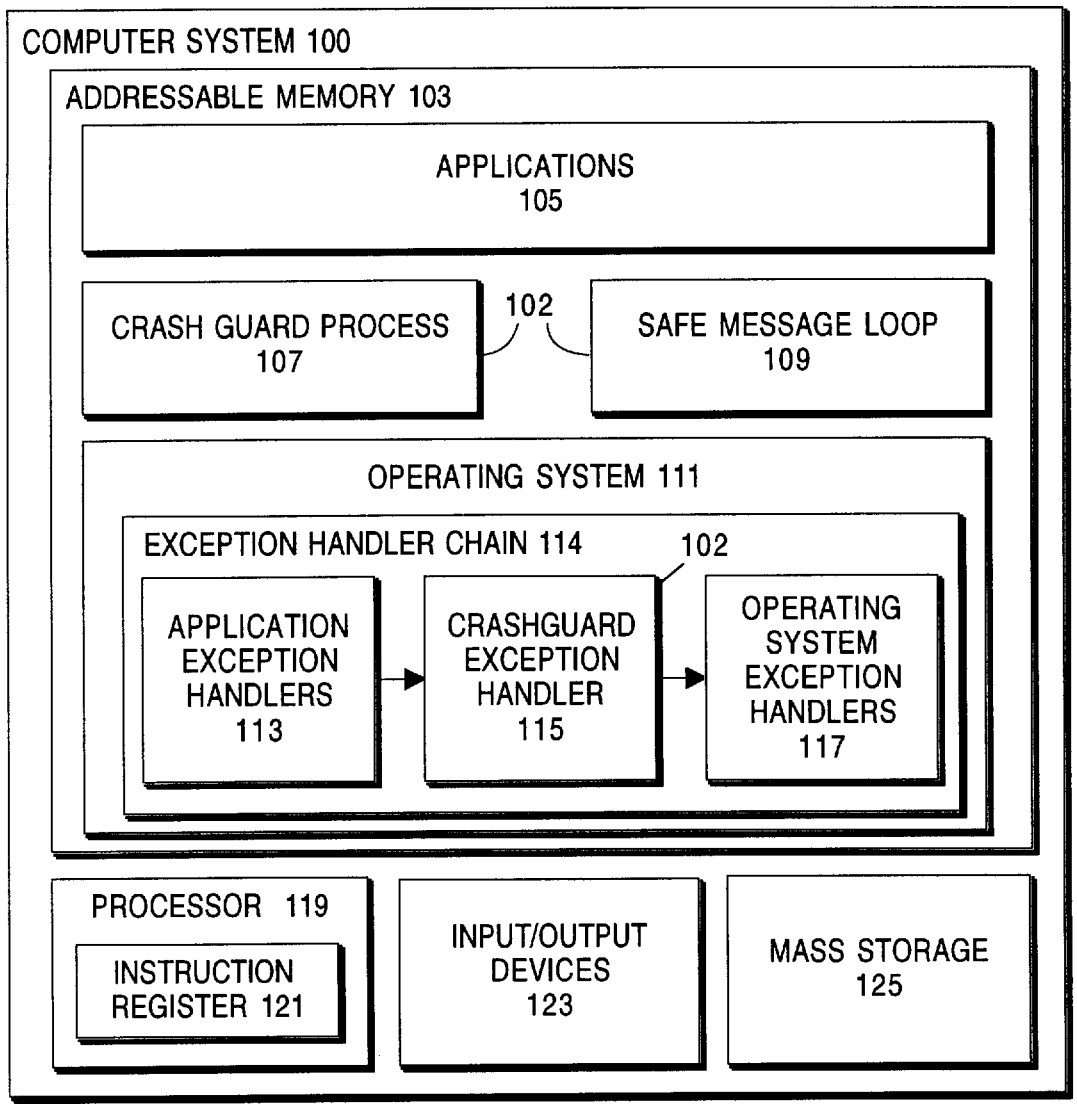
FIG. 1 is an illustration of a computer system configured to handle fatal exceptions in accordance with the present invention.

Referring now to FIG. 1, there is shown the configuration of a computer system in accordance with one embodiment of the present invention. The computer system environment is generally a conventional computer system that has been configured by a software product to operate in accordance with the method of the present invention.

Computer system 100 accordingly includes an addressable memory 103, and a processor 119, along with conventional input (e.g. keyboard and mouse) and output (e.g. display and printers) devices 123, communication links and hard disk or other mass storage unit 125. The processor 119 is conventional, and includes an instruction register 121 which is used to store the memory address of the next instruction to be executed by the processor 119 at any given moment. The computer system 100 may be implemented with conventional hardware, such as an IBM compatible, Intel Pentium® based computer.

Loaded into and executing from the memory 103 are various conventional software applications 105, utilities, and the like, such as word processors, spreadsheets, games, databases, and so forth, the scope and type of which is not limited by the present invention. The term "application" as used herein includes any software, computer program or code entity, whether standing alone or in combination with other software or hardware elements, that is executed by a processor of a computer, and is not limited to the foregoing list. The addressable memory 103 may include virtual memory as commonly used in many computer systems.

In addition to the applications 105, there is installed in the memory 103 a software product 102 in accordance with an embodiment of the present invention, comprising a crash guard process 107, an exception handler 115, and a safe message loop 109. These elements are described below.

Also loaded into and executing from the addressable memory 103 is a conventional operating system 111, such as Microsoft Corp.'s Windows 3.1 or Windows95 operating systems. The operating system 111 includes a chain 114 of exception handlers, including exception handlers 113 installed by the applications 105 and exception handlers 117 installed by the operating system 111 itself. In accordance with the present invention, there is also installed in this chain by the crash guard process 107 the exception handler 115 designed to operate in accordance with the present invention.

The software product 102 of the present invention, including the crash guard process 107, the exception handler 115, and the safe message loop 109 or any variation thereof, may be stored on CD-ROM, diskette, or any other computer readable memory or media, for installation and execution on computer system 100.

The crash guard process 107 is an application that executes in the background while the user is working in another application, such as a word processor. The crash guard process 107 only becomes active when notified by the exception handler 115, which is invoked by the operating system 111 in the exception handler chain 114 whenever an exception is generated. The exception handler 115 of the present invention intercepts those exceptions that are considered fatal, and that would normally cause the operating system 111 to terminate the application. Instead, the exception handler 115 notifies the crash guard process 107 of the fatal exception. The crash guard process 107 then interacts with the user to determine whether to continue executing the application or to terminate it. The crash guard process 107 also informs the operating system 111 that the fatal exception has been handled. Conventional applications 105 used in many operating systems include a main event or message loop that receives events or messages from the operating system 111 and directs those messages to one or more code entities, such as a block of code, windows, procedures, and the like, for handling. The safe message loop 109 is a portion of code that replaces, or substitutes for this main event or message loop of any application 105 once the application generates a fatal exception, and the user has instructed the crash guard process 107 to enable the application 105 to continue executing after the fatal exception has been generated. In this case, the starting memory address of the safe message loop 109 is provided to the processor 119. The processor 119 then executes the safe message loop 109. The starting address is preferably provided to the processor 119 through the instruction register 121 by changing the contents of the memory location that stores, for the process that is the application 105, that process's next instruction to be executed. The contents of this memory location are loaded into the instruction register 121 by the operating system 111 when the application 105 regains control of the processor 119 after the exception handler 115 finishes execution. The safe message loop 109 receives from the operating system 111 messages and events intended for the application 105 that has generated the fatal exception, and provides them to the application for handling. In this manner, the application 105 is enabled to continue executing even after generating a fatal exception.

The safe message loop 109 may be implemented in accordance with the following pseudocode:

```
beginProgram {
do forever {
    getNextMessageFromOs(Message);
    if (MESSAGE == END) then exitApplication();
    dispatch(Message);
    }
}
dispatch(Message) {
switch Message{
  Message001:
    Code to process messages of type Message001;
    break;
  Message002:
    Code to process messages of type Message002;
    break;
  . . .
  MessageNNN
    Code to process messages of type MessageNNN;
    break;
  }
return
}
```

The getNextMessageFromOS( ) function gets the next message from the operating system 111 addressed to the application 105 that has faulted.

The dispatch (Message) is an operating system function that behaves as shown to provide the messages to the appropriate message handlers. Each message handler transfers control to the section of the code in the application 105 which processes messages of type specified by its parameter, Message. When that section of the application code finishes execution, control is returned to the callee, in this case, the do forever portion of the safe message loop 109.

Accordingly, the do forever loop is executable by the processor in a repetitive sequence, receives from the operating system 111 messages intended for the application 105, and provides those messages to the application 105 for handling, thereby enabling the application 105 to continue executing by the processor 119 after the fatal exception has been generated.

Most typical Windows applications are message-oriented and structured as above, and have message loop similar to that illustrated. Thus, the safe message loop 109 replaces the message loop of application 105, and enables it to continue executing.

The safe message loop 109 is one mechanism for continuing the execution of the application 105, and is preferred since its memory location is definitively known by the crash guard process 107, whereas the message loop address within the application 105 is not known, and because of the availability of interfaces in the operating system 111 that allow the safe message loop 109 to pass events to their intended targets in the application 105. In other embodiments of the present invention, other mechanisms may be employed to continue execution of the application in a manner consistent with the present invention.

During the continued execution of the application 105, any variety of different functions and operations may be achieved. For example, the user may save the data or file that is in use with the application before terminating its execution, thereby prevent the loss of work that was in progress when the fatal exception occurred. Alternatively, in a client-server computer system, a fatal exception by the client application need not result in a loss of connection between the client and server. In this context, a crash guard process executing on the client computer may be modified to communicate the occurrence of the exception to a server application, to enable the server application to respond intelligently, which may include saving a current file on the server, rather than on the client. Those of skill in the art will appreciate that the present invention enables many different types of responses to otherwise fatal exceptions.

Computer system 100 as illustrated in FIG. 1 is merely an example of one configuration of a computer system in accordance with the present invention. Following the principles of the present invention, those of skill in the art will readily appreciate variations that may be made thereto while preserving the overall operation of the invention.

Figure 2:
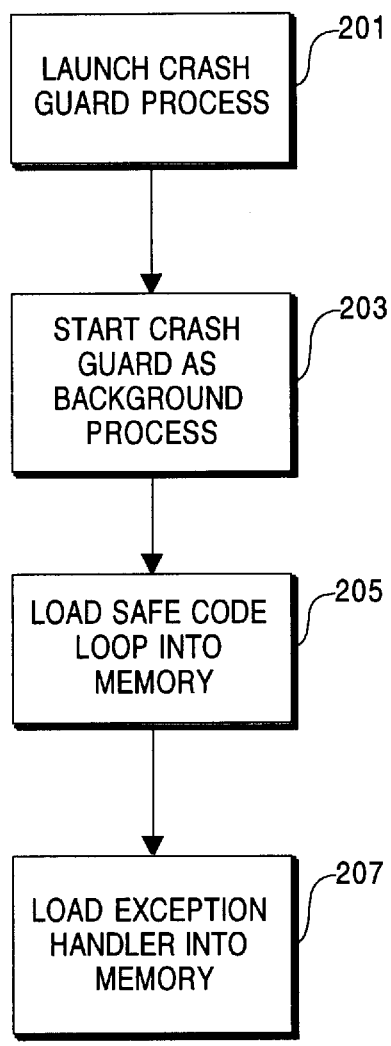
FIG. 2 is a flowchart of the initial process of configuring the computer system in accordance with the present invention.

Referring to FIG. 2 there is shown the process of configuring the system 100 in accordance with the present invention. Assuming that the application for the crash guard process 107, the exception handler 115, and the safe code loop 109 are available on the hard disk of the computer 100, the user manually, or the operating system 111 automatically during boot up, launches 201 the crash guard process 107. The operating system 111 loads 203 the crash guard process 107 into memory 103, and begin execution thereof as a background process. The crash guard process 107 loads 205 the safe message loop 109 into the memory 103. The crash guard process 107 also loads 207 the exception handler 115 of the present invention into the exception handler chain 114 inserting it in the exception handler chain 114 ahead of all operating system provided exception handlers. The memory area chosen for loading the safe message loop 109 is an area of memory 103 that is preferably shared by all processes in the system. Alternatively, on systems which do not support system wide shared memory, the safe message loop 109 may be loaded into the address space of each process upon start up and the address and the process identifier passed to the crash guard process 107. The crash guard process 107 would pass this address along to the exception handler 115 after it finishes processing an exception. The crash guard process 107 passes the starting address of the safe message loop 109 to the exception handler 115 to enable it to subsequently load this address into the instruction register of the processor 119 when needed.

Figure 3:
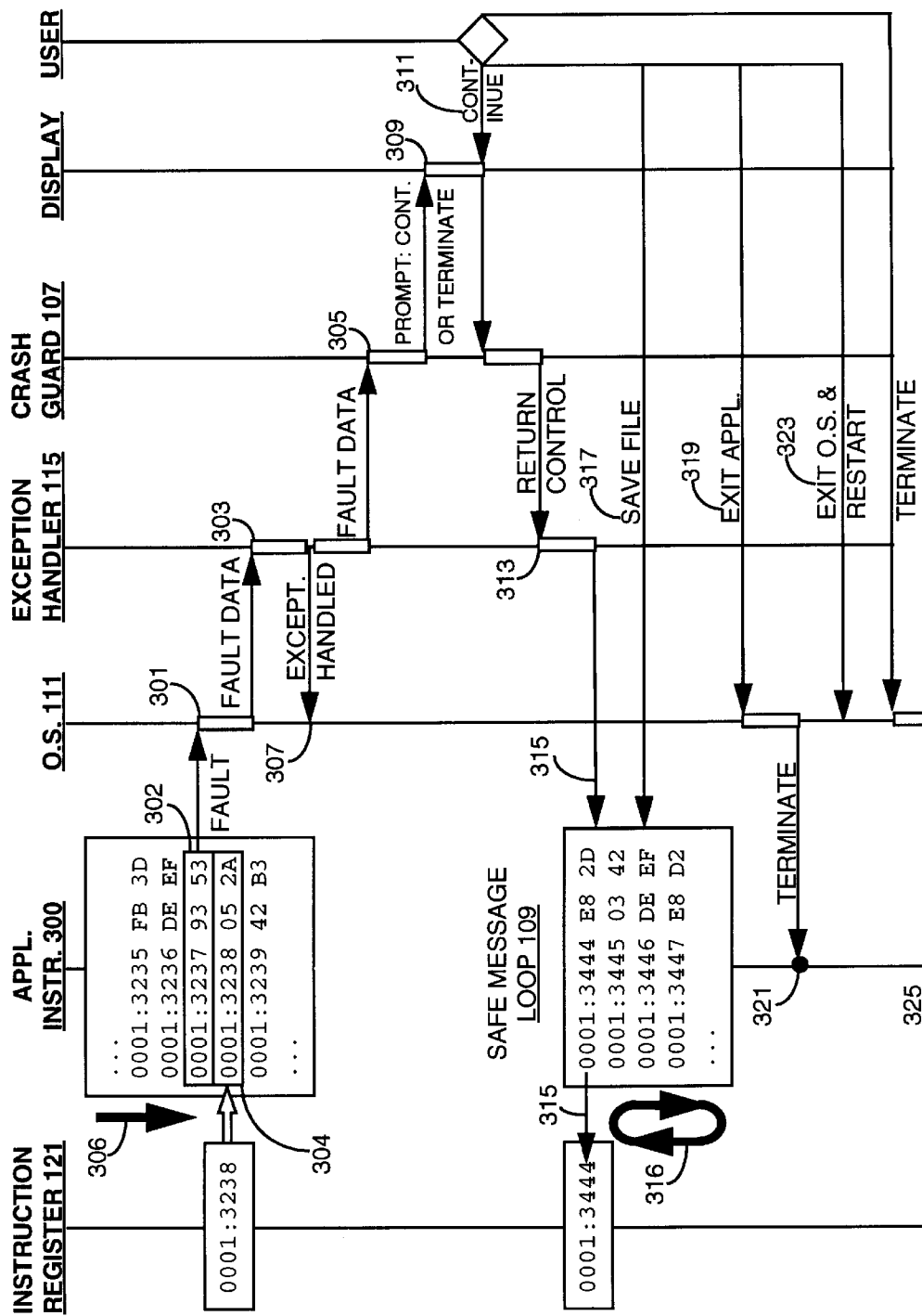
FIG. 3 is an event/message trace of the operation of the computer system in accordance with the present invention.

Referring now to FIG. 3, there is shown an event and message diagram of the operation of the computer system in accordance with one embodiment of the present invention. During the use of the computer system 100, there will be an application 105 in use by the user, typically with one or more data files open. As the application 105 is executing, the processor 119 is reading the next instruction to be executed into the instruction register 121 from the application instructions 300 stored in memory. The thread of control 306 resides in the application.

At some point, the current instruction 302 of the application 105 generates 301 an exception that would otherwise be considered fatal, such as reading outside of its assigned memory space, which is typically a general protection fault. At this point, the instruction register 121 holds 304 the address of the next application instruction to be executed.

The operating system 111 halts the execution of the application's instructions and sends information identifying the exception and system status information ("fault data") to the chain 114 of exception handlers. The system status information contains, at a minimum, information identifying the process that caused the exception. The fault data also preferably includes the name and directory of the faulting application. When exception handler 115 or the present invention is triggered, it invokes 305 the crash guard process 107, and passes the fault data to it.

The specific implementation of how the operating system 111 and exception handler 115 interact is dependent on the operating system 111 of the computer system 100. For example, in Windows 3.1 the ToolHelp library provides a function to insert an exception handler in the existing chain of exception handlers. In a computer system 100 using the Windows95 operating system, the Windows95 kernel functions UnhandledExceptionFilter is modified to jump to a 32-bit version of the exception handler 115 when an exception occurs. Those of skill in the art will be able to readily interface an exception handler 115 as described with the operating system 111 to achieve the process flow of the present invention.

Referring again to FIG. 3, the exception handler 115 also notifies 307 the operating system 111 that the exception has been handled. In this embodiment, the operating system 111 behaves as though the fatal exception is being handled in the proper manner.

Figure 4:
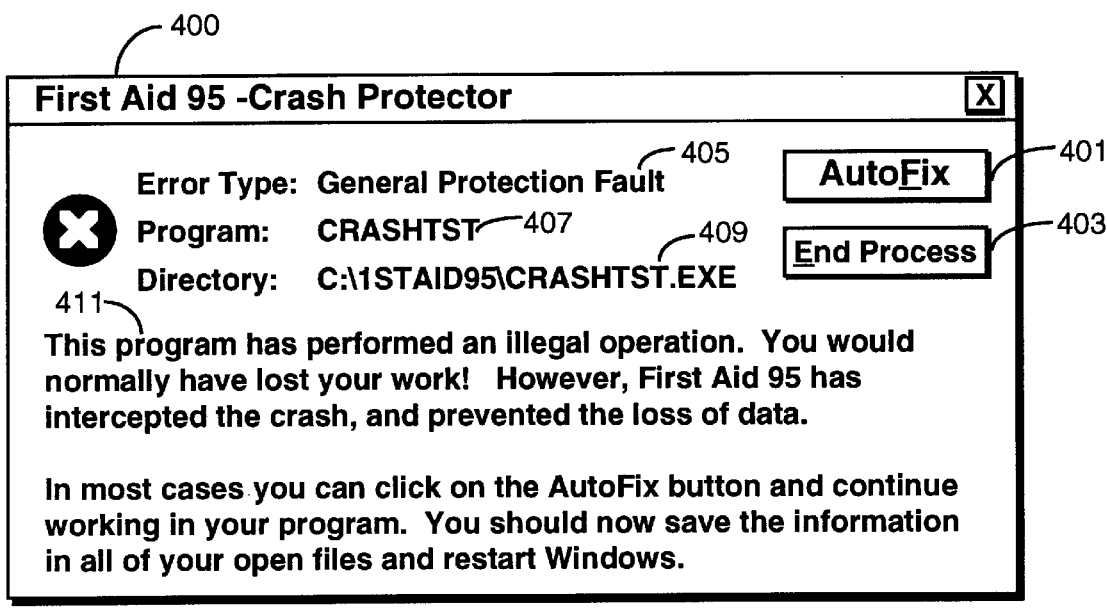
FIG. 4 is an illustration of a prompt to a user to terminate or continue executing an application that has generated a fatal exception.

The crash guard process 107 prompts 309 on the display the user with its own warning dialog instead of one of the operating system's message boxes, such as the general protection fault message box commonly seen in Windows 3.1 or Windows 95. FIG. 4 illustrates one such prompt. In this prompt 400, the user is notified that an illegal operation has been generated. Using the fault data, the prompt 400 specifies the type of error 405, the offending application 407, and the directory 409 where the application is installed. The prompt 400 provides instructions 411 to the user as to how to proceed, indicating that they can save the data of the files currently in use. The user can choose via AutoFix button 401 to continue working, or to terminate the application with End Process button 403, for example if there is no unsaved data.

If the user chooses to continue 311 using the application in order to save data, the crash guard process 107 returns 313 control to the exception handler 115. The exception handler 115 replaces 315 the address that would be the contents of the instruction register 121 with the location of the entry address of the safe message loop 109 that was previously loaded into memory 103 by the crash guard process 107. The operating system 111 then marks the process as being in good condition and eligible for execution. When the process actually gets scheduled for execution, the operating system 111 will use the new values in the instruction register 121 rather than the original value and thus resume its execution at the safe message loop 109. At this point the thread of control 316 is within the safe message loop 109.

As described, the safe message loop 109 receives from the operating system 111 messages for the application 105 and passes them to the application 105, using an application programming interface of the operating system 111 to access the proper code object for each message. The application 105 can thereby continue executing, perhaps indefinitely, as the processor 119 cycles 316 through the safe message loop 109.

Now that the application 105 is still executing, the user may save 317 his or her data, thereby preserving any work in progress, and avoiding the loss of data. While the user may continue to use the application 105 in other ways, it is preferable that the user close 319 the application, which in turn causes the operating system 111 to terminate 321 the application 105 and reclaim any of its resources. If necessary, the user may then exit 323 the operating system and reboot the computer 100.

Alternatively, if the user chooses to terminate 325 the application 105 immediately without saving data, the crash guard process 107 instructs the operating system 111 to terminate 327 the application 105.

As an alternative embodiment of the present invention, the crash guard process 107 may be optional, with only the exception handler 115 and the safe message loop 109 being used in the software product 102. In this embodiment, the exception handler 115 and the safe message loop 109 are installed automatically into memory 103, such as by a startup script, when the computer system 100 is started. Then during operation, the exception handler 115, when invoked 303 by the operating system 111, directly places 315 the entry address of the safe message loop 109 into the instruction register 121, without prompting the user with the choice of continuing or terminating the application 105. While this embodiment is possible, it may not be desirable, since the user would have no knowledge of the exception, and thereby take no steps to correct the problem, such as saving their data and gracefully exiting the application 105. Thus it is preferable to inform the user of the exception, and at least instruct then to save their data. From there, it is optional, and desirable to provide user with the choice of continuing or terminating.

In summary then, the present invention produces a useful method and software product that prevents the loss of use data files in the event of a fatal exception generated by an application. By enabling the application to continue executing in a state conventionally considered unpredictable and unstable, the user is able to save their work and decide whether to terminate the application, rather than having this outcome forced upon him arbitrarily by the operating system.

We claim:

1. In a computer system including a processor, an operating system and at least one application executable by the processor, a computer readable medium storing a software product comprising:

an exception handler that controls the processor to receive a notification from the operating system that an exception has been generated by an application;

a background executable program that is invoked by the exception handler, that notifies the operating system that the exception has been handled; and, a set of instructions provided to the processor by the exception handler, for execution by the processor in a continuous loop, and that receive from the operating system messages for the application and provide the messages to the application for handling, enabling the application to continue execution by the processor after the exception has been generated.

2. The computer readable medium of claim 1, wherein the background executable program displays, in response to the exception being generated by the application, a prompt to a user to either terminate the application or continue executing the application.

3. In a computer system including a memory storing an operating system and an application, a computer implemented process of handling an exception generated by the application, comprising:

receiving a notification from the operating system that a fatal exception has been generated by the application; and in response to the notification, executing an instruction loop to receive from the operating system messages for the application, and to pass the messages to the application for handling, enabling the application to continue executing after the fatal exception has been generated.

4. The computer implemented process of claim 3, further comprising:

notifying the operating system that the fatal exception has been handled.

5. The computer implemented process of claim 3, further comprising:

storing in an instruction register an address of the instruction loop to enable the processor to continue to execute the instruction loop.

6. The computer implemented process of claim 3, wherein the memory includes a memory location storing an address of the next instruction of the application to be executed by the processor, the process further comprising:

replacing the address of the next instruction to be executed stored in the memory location with a starting address of the instruction loop.

7. The computer implemented method of claim 3, further comprising:

as a first step, storing an exception handler in the operating system in order to receive the notification from the operating system.

8. The computer implemented method of claim 3, further comprising:

prompting a user to either terminate the application or continue executing the application.

9. The computer implemented method of claim 3, further comprising:

receiving a user input to save a file currently in use by the application; and saving the file in response to the user input.

10. In a computer system including a processor, an operating system and at least one application executable by the processor, a computer readable medium storing a software product comprising:

an exception handler, executable by the processor, for receiving a notification from the operating system that an exception has been generated by an application; and, a set of instructions, provided to the processor by the exception handler in response to the notification, and executable by the processor in a repetitive sequence, for receiving from the operating system messages for the application and for providing the messages to the application for handling, enabling the application to continue execution by the processor after the exception has been generated.

11. The computer readable medium of claim 10, further comprising:

a process, executable by the processor in response to generation of the exception by the application, for prompting a user to either terminate the application or continue executing the application, and for receiving an input from the user terminating or continuing the application.

* * * * *